United States Patent
Bansbach et al.

(10) Patent No.: US 6,883,657 B2
(45) Date of Patent: *Apr. 26, 2005

(54) POWER TRANSFER DEVICE WITH HYDRAULIC CLUTCH ACTUATION

(75) Inventors: Eric A. Bansbach, Fayetteville, NY (US); Joseph G. Mueller, Cazenovia, NY (US); James Brissenden, Baldwinsville, NY (US); John D. Zalewski, Liverpool, NY (US); Sankar K. Mohan, Dewitt, NY (US); Richard Mizon, Fayetteville, NY (US); Aaron Ronk, Lake George, NY (US); Khazaee Mozaffar, Baldwinsville, NY (US)

(73) Assignee: Magna Drivetrain of America, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/459,984

(22) Filed: Jun. 12, 2003

(65) Prior Publication Data

US 2003/0201145 A1 Oct. 30, 2003

Related U.S. Application Data

(63) Continuation of application No. 09/963,804, filed on Sep. 26, 2001, now Pat. No. 6,595,338.

(51) Int. Cl.$^7$ .......................... F16D 25/08; B60K 17/34
(52) U.S. Cl. .................................... 192/85 C; 180/247
(58) Field of Search ............................. 192/85 R, 85 C, 192/85 CA, 84.6, 91 R, 91 A, 94; 60/545; 180/24.7, 249

(56) References Cited

U.S. PATENT DOCUMENTS

| | | | |
|---|---|---|---|
| 4,234,066 A | 11/1980 | Toyota et al. | |
| 4,766,804 A | 8/1988 | Barker | |
| 4,862,769 A | 9/1989 | Koga et al. | |
| 4,918,921 A | 4/1990 | Leigh-Monstevens et al. | |
| 5,014,603 A | 5/1991 | Navarette et al. | |
| 5,094,079 A | 3/1992 | Leigh-Monstevens et al. | |
| 5,119,298 A | 6/1992 | Naito | |
| 5,133,439 A | 7/1992 | Shellhause | |
| 5,224,906 A | 7/1993 | Sturm | |
| 5,404,981 A | 4/1995 | Romer et al. | |
| 5,611,407 A | 3/1997 | Maehara et al. | |
| 5,735,376 A * | 4/1998 | Moroto et al. | 192/85 CA |
| 5,875,865 A | 3/1999 | Wakahara et al. | |
| 5,928,106 A | 7/1999 | Biros, Jr. et al. | |
| 5,934,432 A | 8/1999 | Bates | |
| 6,047,546 A | 4/2000 | Takeyama | |
| 6,155,396 A | 12/2000 | Tsubata et al. | |
| 6,595,338 B2 * | 7/2003 | Bansbach et al. | 192/85 C |

* cited by examiner

Primary Examiner—Richard M. Lorence
(74) Attorney, Agent, or Firm—Harness, Dickey & Pierce P.L.C.

(57) ABSTRACT

A power transfer system is provided and equipped with a torque transfer coupling which includes a clutch and a ball-screw actuator. The ball-screw actuator functions to axially translate an apply plate via a closed hydraulic system to operatively engage the clutch and vary the frictional engagement thereof.

8 Claims, 6 Drawing Sheets

POWER TRANSFER DEVICE WITH HYDRAULIC CLUTCH ACTUATION

CROSS-REFERENCE TO RELATED APPLICATIONS

This application is a continuation of U.S. patent application Ser. No. 09/963,804 filed on Sep. 26, 2001 now U.S. Pat. No. 6,595,338.

FIELD OF THE INVENTION

The present invention relates generally to power transfer systems operable for controlling the distribution of drive torque between a pair of rotary shafts and, more particularly, to a torque transfer clutch assembly equipped with a hydraulic linear piston clutch actuator.

BACKGROUND OF THE INVENTION

In view of increased consumer demand for four-wheel drive vehicles, a plethora of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. A mechanical mode shift mechanism can be selectively actuated by the vehicle operator for rigidly coupling the non-driven wheel to the driven wheels in order to establish a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the on-demand feature into a transfer case by replacing the mechanically-actuated mode shift mechanism with a clutch assembly that is interactively associated with an electronic control system and a sensor arrangement. During normal road conditions, the clutch assembly is maintained in a non-actuated condition such that the drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement.

Conventional clutch assemblies typically include a clutch pack operably connected between a drive member and a driven member. A power-operated actuator controls engagement of the clutch pack. Specifically, torque is transferred from the drive member to the driven member by actuating the power-operated actuator. The power-operated actuator displaces an apply plate which acts on the clutch pack and increases the frictional engagement between the interleaved plates.

A variety of power-operated actuators have been used in the art. Exemplary embodiments include those disclosed in U.S. Pat. No. 5,407,024 wherein a ball-ramp arrangement is used to displace the apply plate when a current is provided to an induction motor. Another example disclosed in U.S. Pat. No. 5,332,060, assigned to the assignee of the present application, includes a linear actuator that pivots a lever arm to regulate the frictional forces applied to the clutch pack. Neither of these references incorporate a closed hydraulic system to control actuation of the associated clutch. While the above actuator devices may perform adequately for their intended purpose, a need exists for an improved actuator that is less complex, reduces the number of friction generating components which lead to inefficiencies and larger motor requirements, and an annular arrangement that provides operational simplicity and reduced space requirements.

SUMMARY OF THE INVENTION

In view of the above, the present invention is directed to a power transfer system for a four-wheel drive vehicle equipped with a torque transfer clutch assembly having a multi-plate friction clutch pack and a hydraulic linear piston clutch actuator. The hydraulic linear piston clutch actuator includes a ball screw assembly having a threaded lead screw and a ball nut. The threaded lead screw is rotated by an electric motor through a reduction gearset for causing linear translation of the ball nut. A control piston is secured to the ball nut for linear movement in a control chamber which, in turn, is in fluid communication with apply chambers to define a closed hydraulic circuit. Multiple apply chambers are radially located about a transfer plate which is rotatably coupled to a clutch apply plate. An apply piston is retained in each apply chamber and is moveable in response to movement of the control piston for exerting a clutch engagement force on the clutch pack. This clutch actuator arrangement yields numerous operational advantages over the prior art including, but not limited to, improved response characteristics with lower hysteresis, superior torque control improved system efficiency, low cost, and weight savings.

Further areas of applicability of the present invention will become apparent from the detailed description provided hereinafter. However, it should be understood that the detailed description and specific examples, while indicating preferred embodiments of the invention, are intended for purposes of illustration only, since various changes and modifications within the spirit and scope of the invention will become apparent to those skilled in the art from the following detailed description, attached drawings and claims.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

In general, the present invention is directed to a power transfer system which is operably installed between the driven and non-driven wheels of a four-wheel drive vehicle. In operation, the amount of power (i.e., drive torque) transferred to the non-driven wheels is controllably regulated in accordance with various system and driver-initiated inputs for optimizing the tractive characteristics of the vehicle. In addition, the power transfer system may also include a mode select mechanism for permitting a vehicle operator to select between a two-drive wheel mode, a part-time four-wheel drive mode, and an "on-demand" drive mode.

Figure 1:
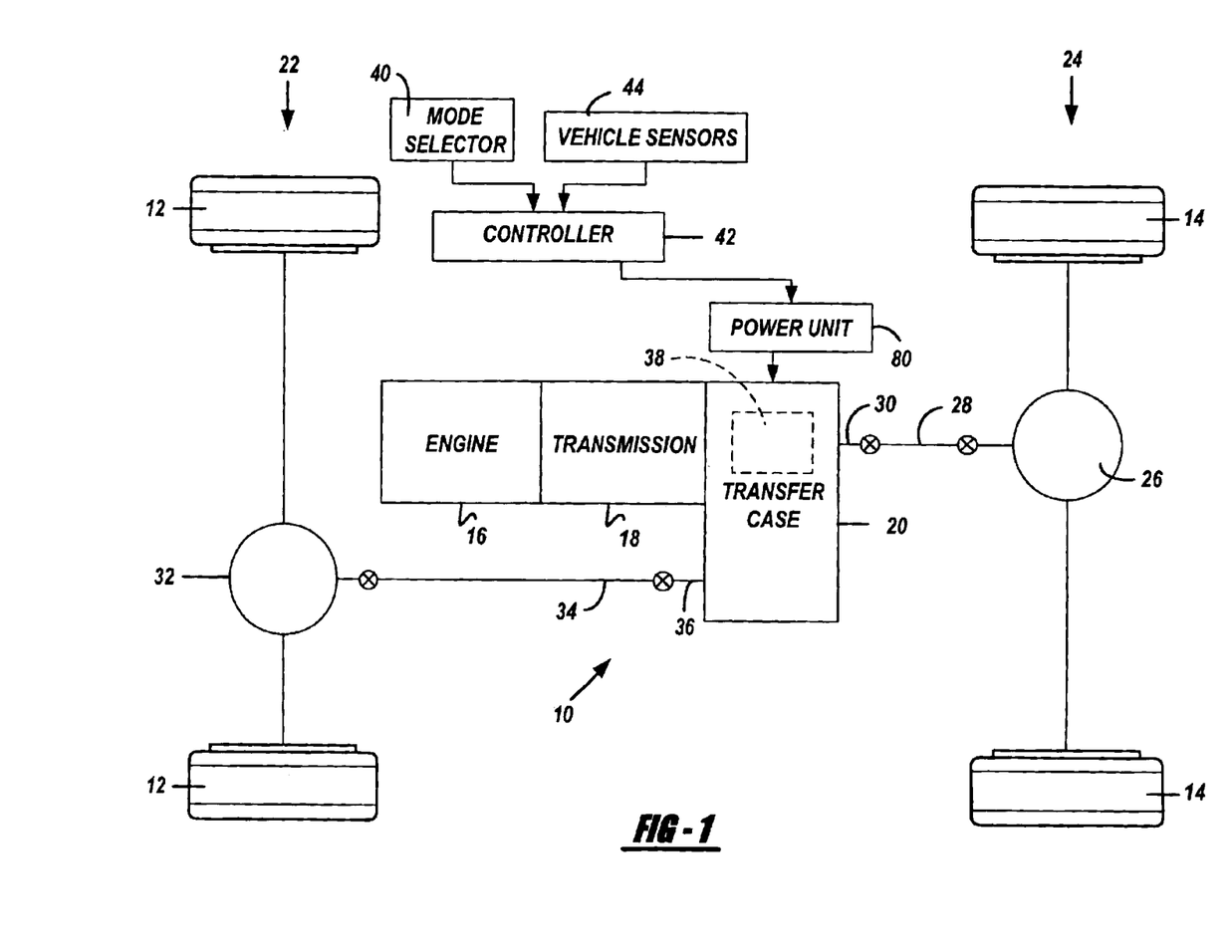
FIG. 1 is a schematic representation of an exemplary four-wheel drive vehicle having the power transfer system of the present invention incorporated therein.

Referring to FIG. 1 of the drawings, a drivetrain for a four-wheel drive vehicle is schematically shown interactively associated with a power transfer system 10. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output shaft 30 of transfer case 20. Similarly, front axle assembly 22 includes a front differential 32 that is coupled to one end of a front drive shaft 34, the opposite end of which is coupled to a second output shaft 36 of transfer case 20. It is to be understood that the specific orientation of the drivetrain is merely exemplary in nature and that the drivetrain could be reversed for normally driving front wheels 12.

Transfer case 20 is equipped with a torque transfer clutch 38 for selectively delivering drive torque to front wheels 12 (i.e., the non-driven wheels) to establish a four-wheel drive mode of operation. The operating mode of transfer clutch 38 is generally controlled in response to a mode signal generated by a mode selector 40 and which is sent to a controller 42. Controller 42 also receives input signals from one or more vehicle sensors 44 that are indicative of various operational characteristic of the vehicle.

When the two-wheel drive mode is selected, all drive torque is delivered from first output shaft 30 to rear wheels 14 and transfer clutch 38 is maintained in a "non-actuated" condition. When the part-time four-wheel drive mode is selected, transfer clutch 38 is fully actuated and maintained in a "lock-up" condition such that second output shaft 36 is, in effect, rigidly coupled for driven rotation with first output shaft 30. When the "on-demand" drive mode is selected, controller 42 controls the degree of actuation of transfer clutch 38 for varying the amount of drive torque directed to front wheels 12 through transfer clutch 38 as a function of the sensor input signals for providing improved tractive performance when needed. In addition, controller 42 is adapted to controllably modulate the actuated state of transfer clutch 38 as described in greater detail hereinafter. By way of example rather than limitation, the control scheme generally disclosed in U.S. Pat. No. 5,332,060 issued Jul. 26, 1994 to Sperduti et al. and assigned to the common assignee of the present invention (the disclosure of which is hereby incorporated by reference) can be used to control adaptive actuation of transfer clutch 38 during on-demand operation.

Figure 2:
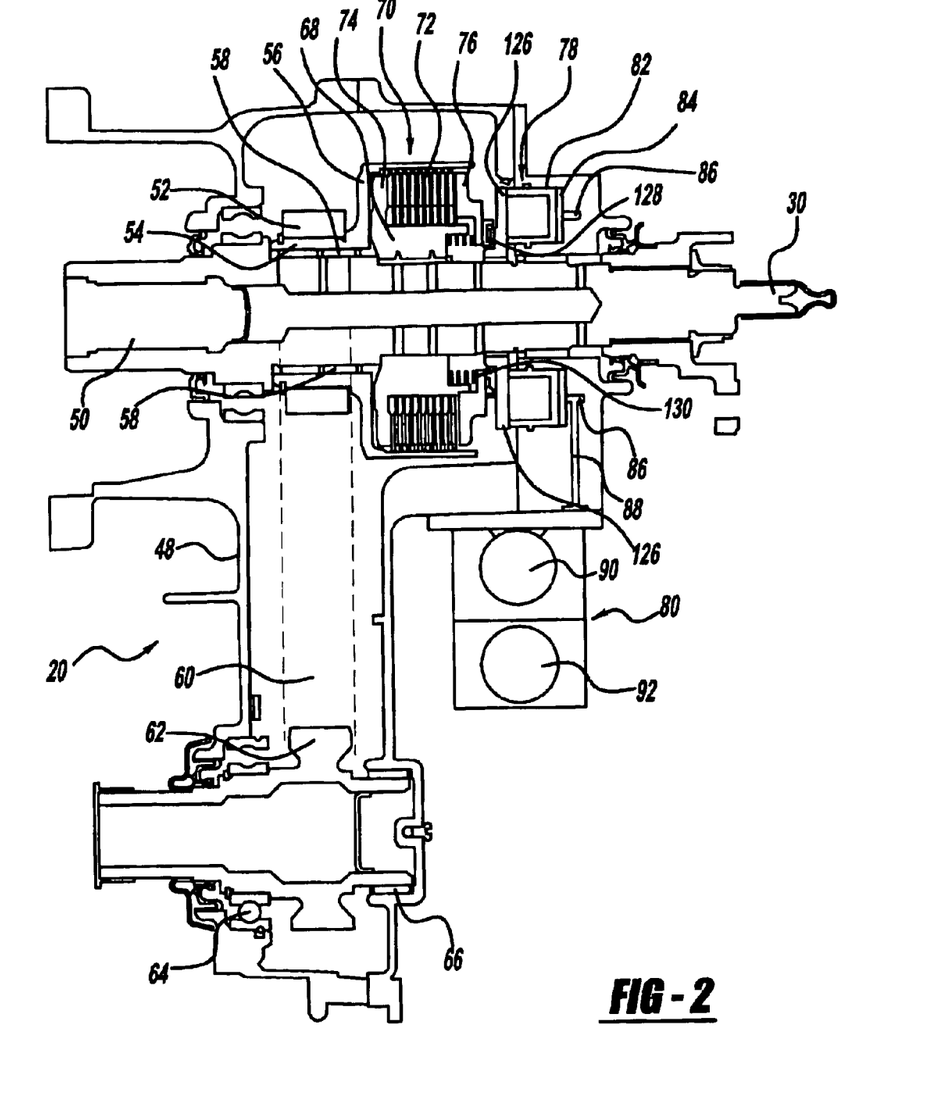
FIG. 2 is a sectional view of a transfer case associated with the power transfer system and which includes a clutch assembly and an electronically-controlled linear piston hydraulic clutch actuator.

Transfer case 20 is shown in FIG. 2 to include a housing 48 formed by a series of modular sections that are suitably interconnected in a conventional manner. A transmission output shaft (not shown) couples transmission 18 (FIG. 1) to a mainshaft 50 of transfer case 20 for supplying power thereto. In the embodiment shown, first output shaft 30 is connected to mainshaft 50 which is supported for rotation within housing 48. For simplicity, the illustrated embodiment shows mainshaft 50 extending through the transfer case 20 so as to define a single-speed power transfer unit. Those skilled in the art will appreciate that a two-speed version of transfer case 20 could likewise be used in association with the novel active torque bias clutch system of the present invention. Examples of known planetary two-speed gearsets and range clutch arrangements are shown in commonly-owned U.S. Pat. Nos. 5,700,222, and 5,836,847.

With continued references to FIG. 2, transfer clutch 38 is shown for transferring drive torque from mainshaft 80 to front wheels 12. More specifically, a drive sprocket 52 is fixed (i.e., splined) for rotation on a tubular extension 54 of a cylindrical drum 56 associated with transfer clutch 38. In addition, extension 54 is rotatably supported on mainshaft 50 by one or more suitable bearing assemblies 58. Drive sprocket 52 drivingly engages a chain 60 which is coupled to a lower driven sprocket 62. Driven sprocket 62 is coupled to, or an integral portion of, second output shaft 36 of transfer case 20. Second output shaft 36 is supported for rotation within housing 48 by suitable bearing assemblies 64 and 66. As noted in FIG. 1, second output shaft 36 is operably connected to the motor vehicle's front wheels 12 via front drive shaft 34.

Transfer clutch 38 is a multi-plate clutch assembly that is arranged to concentrically surround a portion of mainshaft 50. As noted, cylindrical drum 56 is fixedly secured to drive sprocket 52 so as to drive, or be driven by, front output shaft 36 of transfer case 20. In a preferred form, transfer clutch 38 also includes a clutch hub 68 that is concentrically surrounded by drum 56 and which is fixed (i.e., splined) to mainshaft 50 for rotation therewith. Thus, clutch hub 68 and drum 56 are capable of rotating relative to one another and form an internal chamber therebetween. Disposed within the internal chamber is a clutch pack 70 comprised of two sets of alternatively interleaved friction clutch plates 72 that are operable for transferring torque from mainshaft 50 through clutch hub 68 to drum 56 and, ultimately, to front output shaft 36 in response to a clutch engagement force applied thereto. One set of clutch plates, referred to as inner clutch plates, are mounted (i.e., splined) for rotation with clutch hub 68 while the second set of clutch plates, referred to as outer clutch plates, are mounted (i.e., splined) for rotation with drum 56. In addition, a reaction plate 74 is mounted on or integral with one end of clutch hub 68. A pressure apply plate 76 is rotatable with drum 56 and yet is axially movable with respect to the interleaved friction clutch plates of clutch pack 70. Thus, apply plate 76 acts as a pressure plate for compressing the interleaved clutch plates 72 so as to cause drive torque to be transferred through transfer clutch 38 as a function of the clutch engagement force exerted on apply plate 76 which is generated by a power-operated clutch actuator 78.

Figure 3:
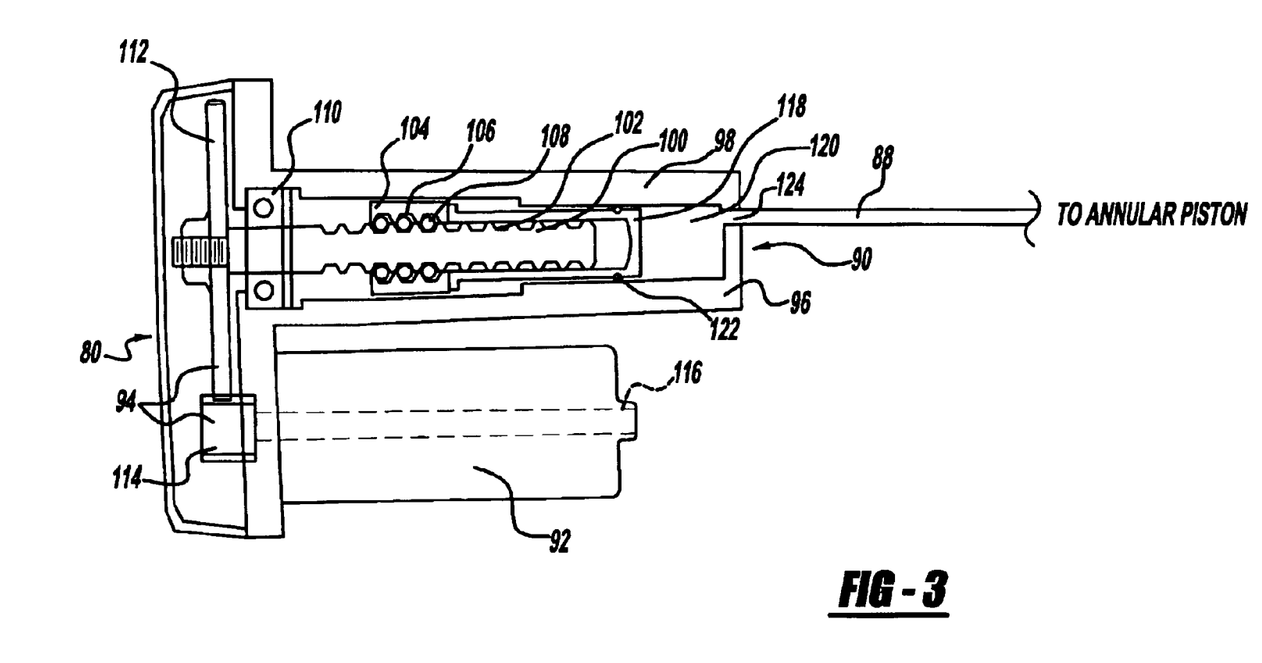
FIG. 3 is a sectional view of the linear piston power unit associated with the transfer case shown in FIG. 2.

Power-operated clutch actuator 78 includes a linear piston hydraulic power unit 80 and an apply piston 82 interconnected via a closed hydraulic circuit (see FIG. 3). Apply piston 82 is shown in FIG. 2 to be an annular component retained in an apply chamber 84 connected to housing 48.

Figure 3A:
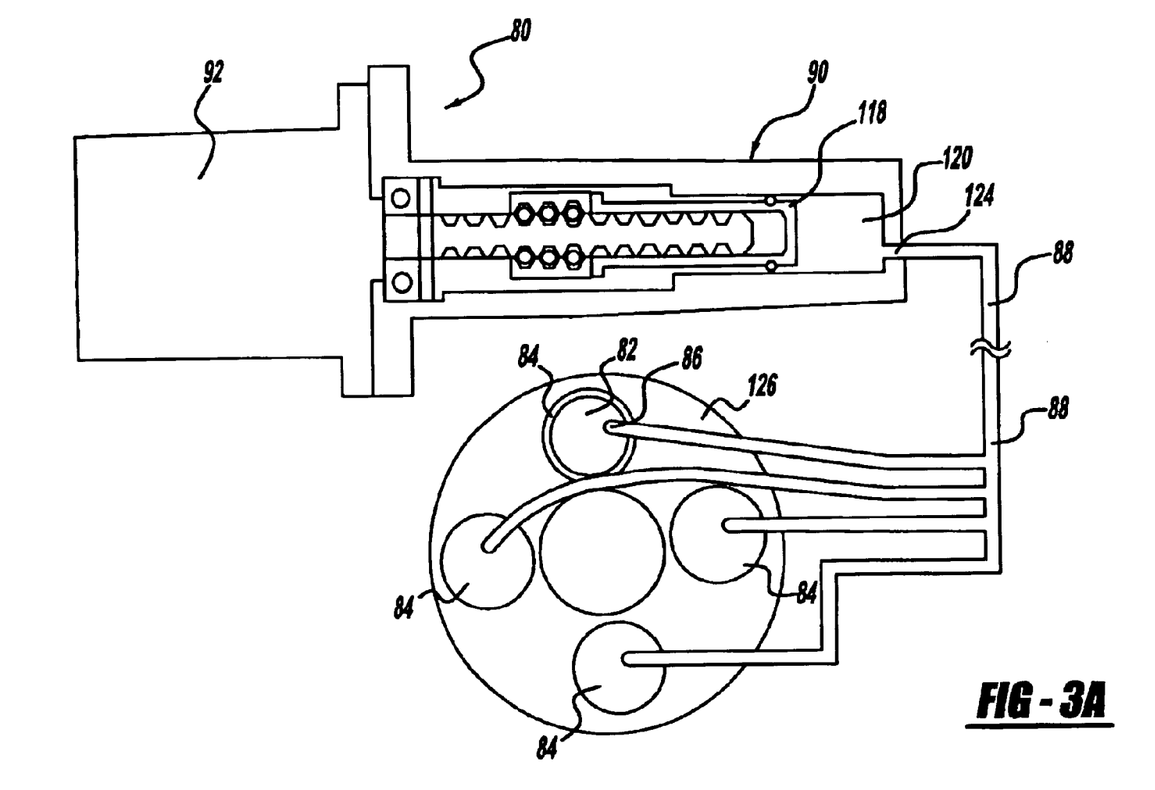
FIG. 3A is a sectional view of the linear piston power unit which shows an alternate embodiment of the invention incorporating more than one apply piston.
Figure 4:
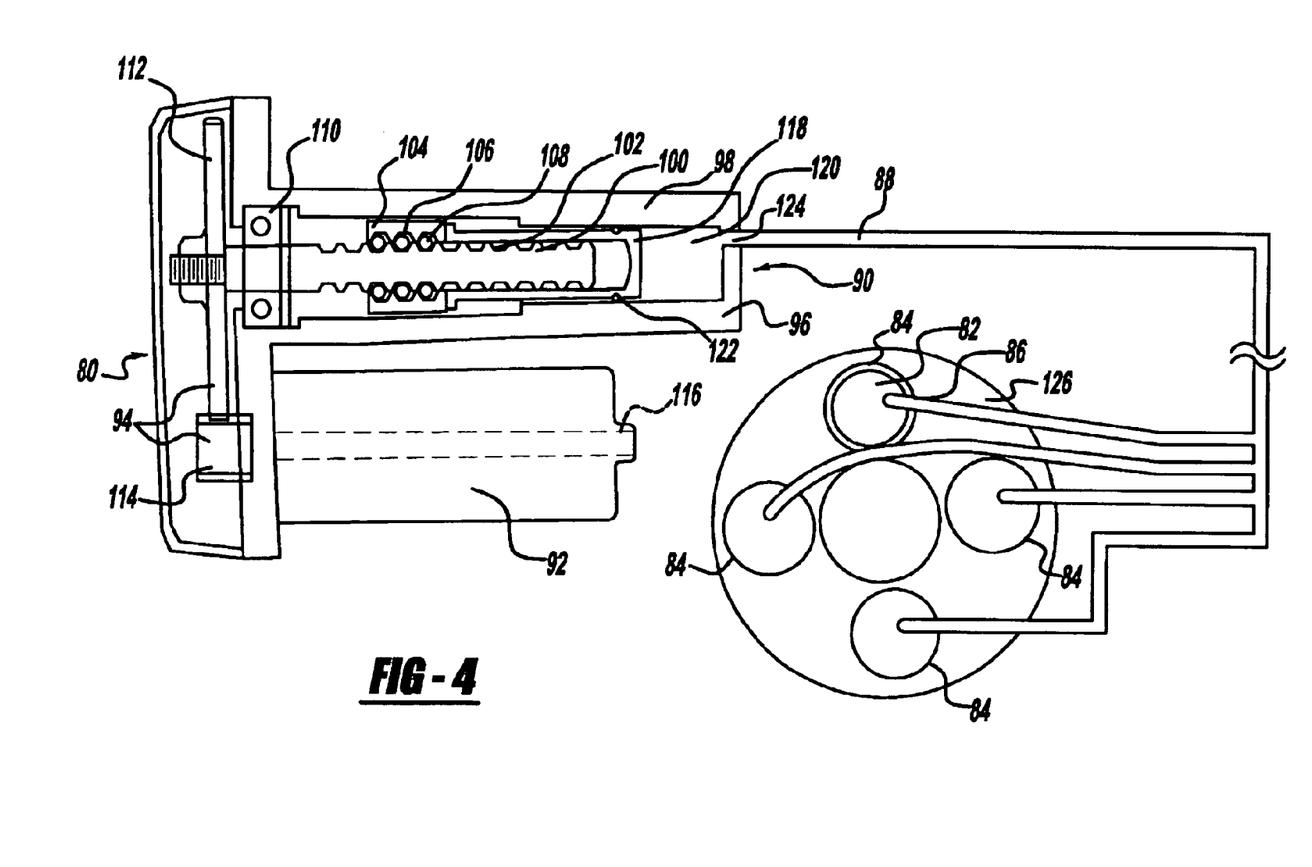
FIG. 4 is a sectional view of an axial arrangement of the linear piston power unit shown in FIG. 3A.
Figure 5:
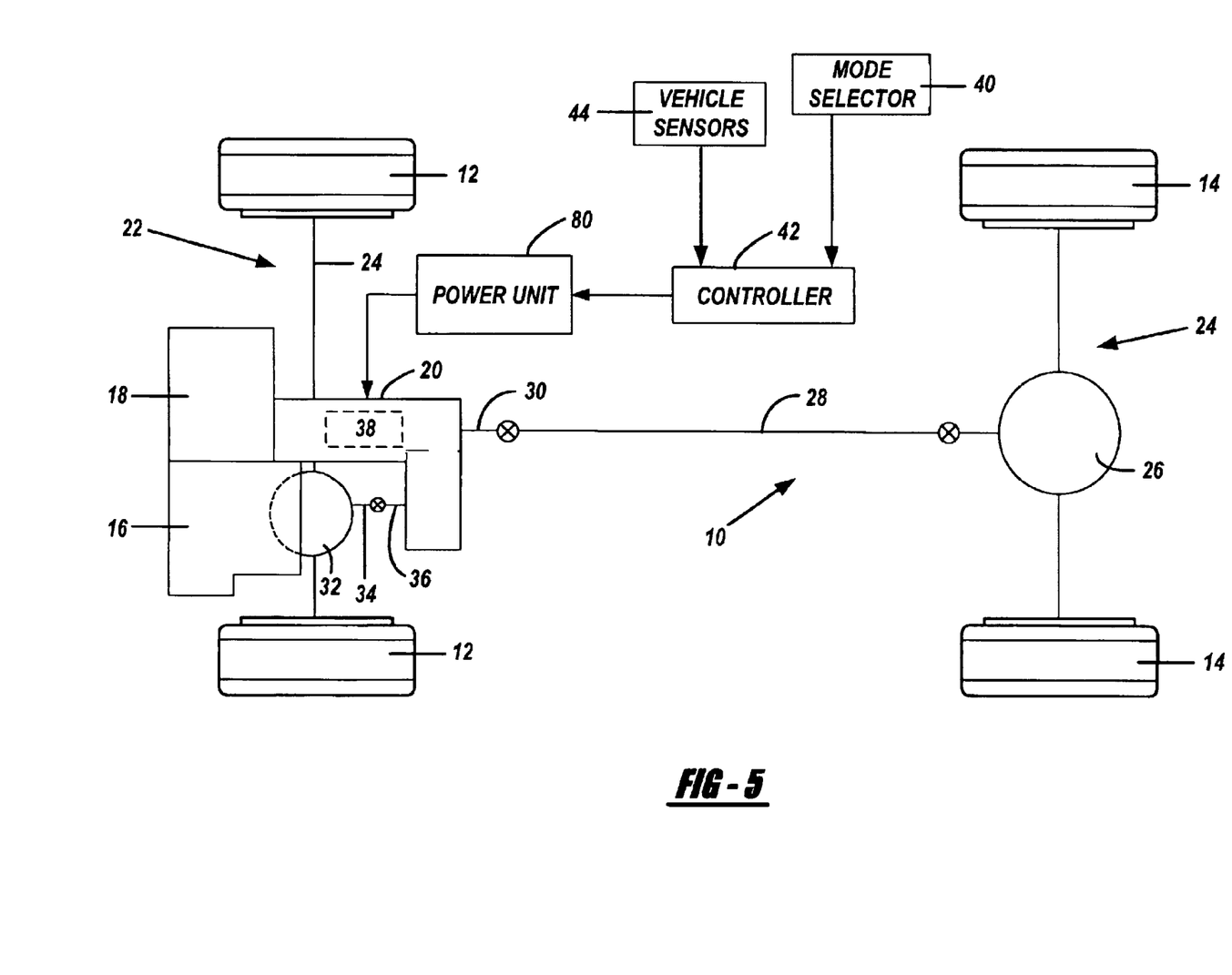
FIG. 5 is an alternate arrangement of the four-wheel drive vehicle shown in FIG. 1.

An inlet passage 86 communicates with apply chamber 84 and receives hydraulic fluid through one or more supply passages 88. An alternative embodiment of the apply piston arrangement, as shown in FIGS. 3A and 4, includes multiple apply pistons 82 retained within apply chambers 84.

Linear piston hydraulic power unit 80 is fixed to housing 48 and is shown in FIG. 3 to generally include a ball-screw assembly 90 operably coupled to an electric motor 92 via a reduction gearset 94. Ball-screw assembly 90 is retained in a cylindrical housing 96 that is integral to or connected to control cylinder 98. Ball-screw assembly 90 includes a lead screw 100 having thread 102, a ball nut 104 having threads 106, and rollers 108 retained between the threads 102 and 106. Lead screw 100 is supported for rotation in housing 96 by a bearing assembly 110. Rotation of lead screw 100 in a first rotary direction causes linear translation of ball nut 104 in a first axial direction while rotation of lead screw 100 in the opposite second rotary direction causes linear translation of ball nut 104 in a second axial direction. Reduction gearset 94 is shown to include a first gear 112 that is fixed for rotation with lead screw 100. A second gear 114 that is fixed for rotation with a rotor shaft 116 of electric motor 92 is meshed with first gear 112. Thus, rotation of rotor shaft 116 upon actuation of electric motor 92 controls the resulting direction and magnitude of linear movement of ball nut 104.

Control piston 118 is shown fixed to ball nut 104 for linear bi-directional movement therewith. Control piston 118 is a closed-ended cylindrical member concentrically mounted over the end of lead screw 100 and which is sealed relative to a control chamber 120 formed in control cylinder 98 via a seal ring 122. Supply passage(s) 88 are in fluid communication with control chamber 120 via a corresponding number of control ports 124. FIGS. 3A and 4 show supply passages 88 interconnecting to a common control port 124.

Referring again to FIG. 2, apply piston(s) 82 acts on a transfer plate 126 journalled on mainshaft 50 which, in turn, transfers the clutch engagement force to apply plate 76 through a thrust bearing assembly 128. Transfer plate 126 is an annular component adapted to radially accommodate multiple apply pistons 82. A return spring 130 acts between clutch hub 68 and apply plate 76 toward a released position.

Referring to FIGS. 1 to 5 collectively, controller 42 determines the operational mode based on the current mode signal delivered thereto via mode selector 40. If the two-wheel drive mode is selected, controller 42 sends an electric control signal to electric motor 92 causing rotation of rotor shaft 116 in a direction which, in turn, causes linear retraction (i.e., toward the electric motor 92 in FIG. 4) of control piston 118 in control chamber 120 to a first position. Since hydraulic fluid is virtually incompressible, the fluid displaced by such movement of control piston 118 causes corresponding retraction of apply piston 82 (i.e., away from apply plate 76 in FIG. 2). Concurrently, return spring 130 forcibly urges apply plate 76 to its released position such that no drive torque is transferred through clutch pack 70 to second output shaft 36.

When the part-time four-wheel drive mode is selected, controller 42 sends an electric signal to motor 92 causing rotation of rotor shaft 116 in a direction causing linear extension (i.e., away from the electric motor 92 in FIG. 4) of control piston 118 in control cylinder 98 to a second position. The fluid displaced by such movement of control piston 118 to its second position causes corresponding expansion of apply piston 82 (i.e., toward apply plate 76 in FIG. 2) for exerting a predetermined maximum clutch engagement force on clutch pack 70, thereby rigidly coupling clutch drum 56 for rotation with clutch hub 68.

When the on-demand drive mode is selected, the amount of drive torque transferred through clutch pack 76 is adaptively controlled as a function of various vehicle conditions which may include, without limitation, interaxle speed difference, vehicle speed, throttle position, brake status, steering angle, etc. Controller 42 calculates a desired clutch engagement force and generates the same by controlling the position of control piston 118 between its first and second positions.

FIG. 3A depicts linear piston hydraulic power unit 80 where electric motor 92 is axially aligned with ball-screw assembly 90. This axial arrangement eliminates reduction gearset 94 to further reduce the friction loss associated with known clutch actuation assemblies. Any required mechanical advantage can be accomplished through a change in diameter of either control piston 118 or apply piston(s) 82.

In view of the above arrangement, rotor shaft 116 acts as the input to the ball-screw yielding a mechanically simple system that eliminates more complex mechanical designs generally used in the art that include a plurality of gears and/or linkages. As each of the mechanical components of the actuator contain friction elements, the elimination of some of these components and the more simple design provided by the present invention reduces the overall friction and therefore increases the efficiency of the assembly. Increased efficiency is translated into more economical clutch actuation electric motors and more accurate clutch torque estimation. Those skilled in the art will appreciate that a variety of electric motors may be used including a DC brush, DC brushless, and stepper motors.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A power transfer assembly for use in a motor vehicle having a powertrain and first and second drivelines, comprising:

a first shaft adapted to transfer drive torque from the powertrain to the first driveline;

a second shaft adapted for connection to the second driveline;

a transfer clutch operably disposed between said first and second shafts;

an apply plate operable in a first position to exert a minimum clutch engagement force on said transfer clutch and in a second position to exert a maximum clutch engagement force on said transfer clutch; and a clutch actuator for controlling movement of said apply plate, said clutch actuator including a first piston disposed in a first chamber, a second piston disposed in a second chamber, a closed hydraulic fluid circuit interconnecting said first and second chambers, a nut fixed to said second piston, a lead screw in threaded engagement with said nut, and an electric motor for controlling rotation of said lead screw via a reduction gearset operably disposed between a rotor shaft of said electric motor and said lead screw, said second piston being a closed-ended cylindrical member extending forward of said nut and concentrically mounted over an end of said lead screw and being provided with a seal between said second piston and said second chamber.

2. The power transfer assembly of claim 1 wherein rotation of said lead screw in a first direction causes axial travel of said nut and said second piston from a first position to a second position which, in turn, causes said hydraulic fluid to forcibly urge said first piston to move from a first position to a second position for moving said apply plate from its first position to its second position.

3. The power transfer assembly of claim 2 wherein rotation of said lead screw in a second direction causes axial travel of said second piston with said nut from its second position to its first position, thereby permitting a return spring to forcibly urge said apply plate to move from its second position to its first position, thereby causing said first piston to move from its second position to its first position.

4. The power transfer assembly of claim 1 wherein said clutch actuator further includes rollers disposed between internal threads formed on said nut and external threads formed on said lead screw.

5. The power transfer assembly of claim 1 further comprising a transfer plate operably disposed between said first piston and said apply plate.

6. The power transfer assembly of claim 5 further comprising a plurality of said first pistons circumferentially arranged to surround said first shaft, with each of said first pistons engaging said transfer plate and disposed in corresponding first chambers in fluid communication with said second chamber.

7. A power transfer assembly for use in a motor vehicle having a powertrain and a driveline, comprising:
a first shaft driven by the powertrain;
a second shaft connected to the driveline;
a transfer clutch adapted to transmit drive torque from said first shaft to said second shaft;
an apply plate that is axially moveable relative to said transfer clutch between a first position for generating a minimum clutch engagement force and a second position for generating a maximum clutch engagement force;
a transfer plate that is axially moveable relative to said apply plate to selectively transmit force thereon;
an apply piston disposed in an apply chamber and operable to selectively translate said transfer plate in response to a hydraulic force; and
a clutch actuator for generating said hydraulic force and including a control piston disposed in a control chamber, a hydraulic fluid circuit connecting said control chamber to said apply chamber, and a power-operated mechanism for controlling movement of said control piston in said control chamber including a nut fixed to said control piston, a lead screw in threaded engagement with said nut, and an electric motor for controlling rotation of said lead screw via a reduction gearset operably disposed between a rotor shaft of said elctric motor and said lead screw, said control piston being a closed-ended cylindrical member extending forward of said nut and concentrically mounted over an end of said lead screw and being provided with a seal between said second piston and said second chamber.

8. The power transfer assembly of claim 7 wherein said power-operated mechanism includes a ball screw assembly.

* * * * *